US012806666B2

(12) United States Patent
Handa et al.

(10) Patent No.: US 12,806,666 B2
(45) Date of Patent: Nov. 24, 2026

(54) SUBSTRATE CLEANING DEVICE, SUBSTRATE CLEANING METHOD, AND SUBSTRATE POLISHING APPARATUS

(71) Applicant: EBARA CORPORATION, Tokyo (JP)

(72) Inventors: Naoyuki Handa, Tokyo (JP); Satomi Hamada, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 311 days.

(21) Appl. No.: 18/683,735

(22) PCT Filed: Aug. 19, 2022

(86) PCT No.: PCT/JP2022/031289
§ 371 (c)(1),
(2) Date: Feb. 14, 2024

(87) PCT Pub. No.: WO2023/022210
PCT Pub. Date: Feb. 23, 2023

(65) Prior Publication Data

US 2024/0351078 A1 Oct. 24, 2024

(30) Foreign Application Priority Data

Aug. 19, 2021 (JP) ................................ 2021-134075

(51) Int. Cl.
*B08B 7/04* (2006.01)
*B08B 1/14* (2024.01)
(Continued)

(52) U.S. Cl.
CPC .................. *B08B 7/04* (2013.01); *B08B 1/14* (2024.01); *B08B 1/34* (2024.01); *B08B 3/02* (2013.01); *B24B 37/34* (2013.01)

(58) Field of Classification Search
CPC ................ B08B 7/04; B08B 1/14; B08B 3/02
See application file for complete search history.

(56) References Cited

U.S. PATENT DOCUMENTS 6,494,985 B1 12/2002 Sotozaki et al.
2001/0024852 A1 9/2001 Aoki et al.
(Continued)

FOREIGN PATENT DOCUMENTS

JP 2001-035821 A 2/2001
JP 2001-237389 A 8/2001
(Continued)

OTHER PUBLICATIONS

International Patent Application No. PCT/JP2022/031289; Int'l Search Report dated Nov. 1, 2022; 4 pages.

*Primary Examiner* — Shay Karls
(74) *Attorney, Agent, or Firm* — BakerHostetler

(57) ABSTRACT

A substrate cleaning apparatus that brings a cleaning tool into sliding contact with a substrate surface while rotating the substrate to perform scrub-cleaning includes a cleaning liquid supply unit that ejects cleaning liquid onto the surface of the substrate to perform a rinsing process of the substrate after scrub-cleaning, in which a temperature of the cleaning liquid in the rinsing process is set to 0° C. to 20° C. The cleaning liquid supply unit includes a first cleaning liquid supply unit that supplies the cleaning liquid toward the vicinity of the center of the substrate and a second cleaning liquid supply unit that supplies the cleaning liquid in a spray form toward a region between the center and an edge of the substrate, and a first ejection angle by the first cleaning liquid supply unit is smaller than a second ejection angle by the second cleaning liquid supply unit.

7 Claims, 11 Drawing Sheets

(51) Int. Cl.

| | |
|---|---|
| ***B08B 1/34*** | (2024.01) |
| ***B08B 3/02*** | (2006.01) |
| ***B24B 37/34*** | (2012.01) |

(56) References Cited

U.S. PATENT DOCUMENTS

| | | | |
|---|---|---|---|
| 2002/0035762 | A1 | 3/2002 | Okuda et al. |
| 2015/0348806 | A1 | 12/2015 | Ishibashi |

FOREIGN PATENT DOCUMENTS

| | | | |
|---|---|---|---|
| JP | 2002-203830 | A | 7/2002 |
| JP | 2009-260034 | A | 11/2009 |
| JP | 2015-201627 | A | 11/2015 |
| JP | 2018-056385 | A | 4/2018 |

SUBSTRATE CLEANING DEVICE, SUBSTRATE CLEANING METHOD, AND SUBSTRATE POLISHING APPARATUS

TECHNICAL FIELD

The present invention relates to an apparatus and a method for cleaning a substrate after polishing.

RELATED ART

One of methods for planarizing a surface of a substrate for formation of a semiconductor device is polishing by a chemical mechanical polishing (CMP) apparatus. In CMP, a surface of an object to be polished, such as the substrate, is pressed against a polishing member, and the polishing member and the object to be polished are moved relative to each other while supplying a polishing liquid between the polishing member and the object to be polished, so that the surface of the object to be polished is polished flat.

A polishing apparatus that polishes a substrate includes a substrate cleaning apparatus that cleans a surface of the substrate after a polishing process (see, for example, Japanese Patent Application Laid-Open No. 2001-35821). In substrate cleaning, the polished substrate is rotated and a cleaning tool such as a roll sponge or a pen sponge is rotated on the substrate while spraying a cleaning liquid onto the substrate to perform the substrate cleaning. After the substrate cleaning with the cleaning liquid, the cleaning tool is retracted from the substrate, and a chemical liquid or pure water (deionized water: DIW) is supplied to the substrate to perform a rinsing process on the surface of the substrate. As a result, particles (for example, particles of a polishing agent that have not been removed by the cleaning process or particles of the polished substrate) remaining on the substrate after the cleaning process are removed.

SUMMARY

In the substrate cleaning process, pH of the cleaning liquid supplied to the surface of the substrate is adjusted to the base side in order to suppress adhesion of the particles to the substrate. However, a flow speed of the cleaning liquid in the vicinity of the surface of the substrate becomes extremely low due to the viscosity of the cleaning liquid on the surface of the substrate, and thus, it is difficult to discharge the particles floating in the cleaning liquid on the surface of the substrate to the outside of the substrate even by the rinsing process. Further, in a case where the cleaning tool is retracted from the substrate after scrubbing the substrate and the rinsing process is performed, the cleaning liquid to which the particles adhere may drop from the cleaning tool to the substrate during the rinsing process. Thus, there is a possibility that the particles adhering onto the substrate remain during the rinsing process, and the quality of the substrate after the polishing and cleaning process is degraded.

One aspect of the invention is a substrate cleaning apparatus that brings a cleaning tool into sliding contact with a surface of a substrate while rotating the substrate to perform scrub-cleaning, the substrate cleaning apparatus including: a cleaning tool drive mechanism configured to retract the cleaning tool from the surface of the substrate after the scrub-cleaning; and a cleaning liquid supply unit configured to eject a cleaning liquid to the surface of the substrate to perform a rinsing process of the substrate after the scrub-cleaning, in which a temperature of the cleaning liquid in the rinsing process is set to 0° C. to 20° C.

One aspect of the invention is a substrate cleaning apparatus that brings a cleaning tool into sliding contact with a surface of a substrate while rotating the substrate to perform scrub-cleaning, the substrate cleaning apparatus including a cleaning liquid supply unit configured to eject a cleaning liquid to the surface of the substrate to perform a rinsing process of the substrate after the scrub-cleaning, in which the cleaning liquid supply unit includes a first cleaning liquid supply unit configured to supply the cleaning liquid toward the vicinity of the center of the substrate and a second cleaning liquid supply unit configured to supply the cleaning liquid in a spray form toward a region between the center and an edge of the substrate, and a first ejection angle is smaller than a second ejection angle when an ejection angle of the cleaning liquid by the first cleaning liquid supply unit with respect to the surface of the substrate is defined as the first ejection angle, and an ejection angle of the cleaning liquid by the second cleaning liquid supply unit with respect to the surface of the substrate is defined as the second ejection angle.

One aspect of the invention is a substrate cleaning apparatus that brings a cleaning tool into sliding contact with a surface of a substrate while rotating the substrate to perform scrub-cleaning, the substrate cleaning apparatus including: a cleaning liquid supply unit configured to eject a cleaning liquid to the surface of the substrate to perform a rinsing process of the substrate after the scrub-cleaning; and a substrate rotating mechanism configured to rotate the substrate at a predetermined speed, in which the substrate rotating mechanism is configured to rotate the substrate at a first speed in a first period during the rinsing process, and rotate the substrate at a second speed faster than the first speed in a second period following the first period.

DETAILED DESCRIPTION

First Embodiment

Figure 1:
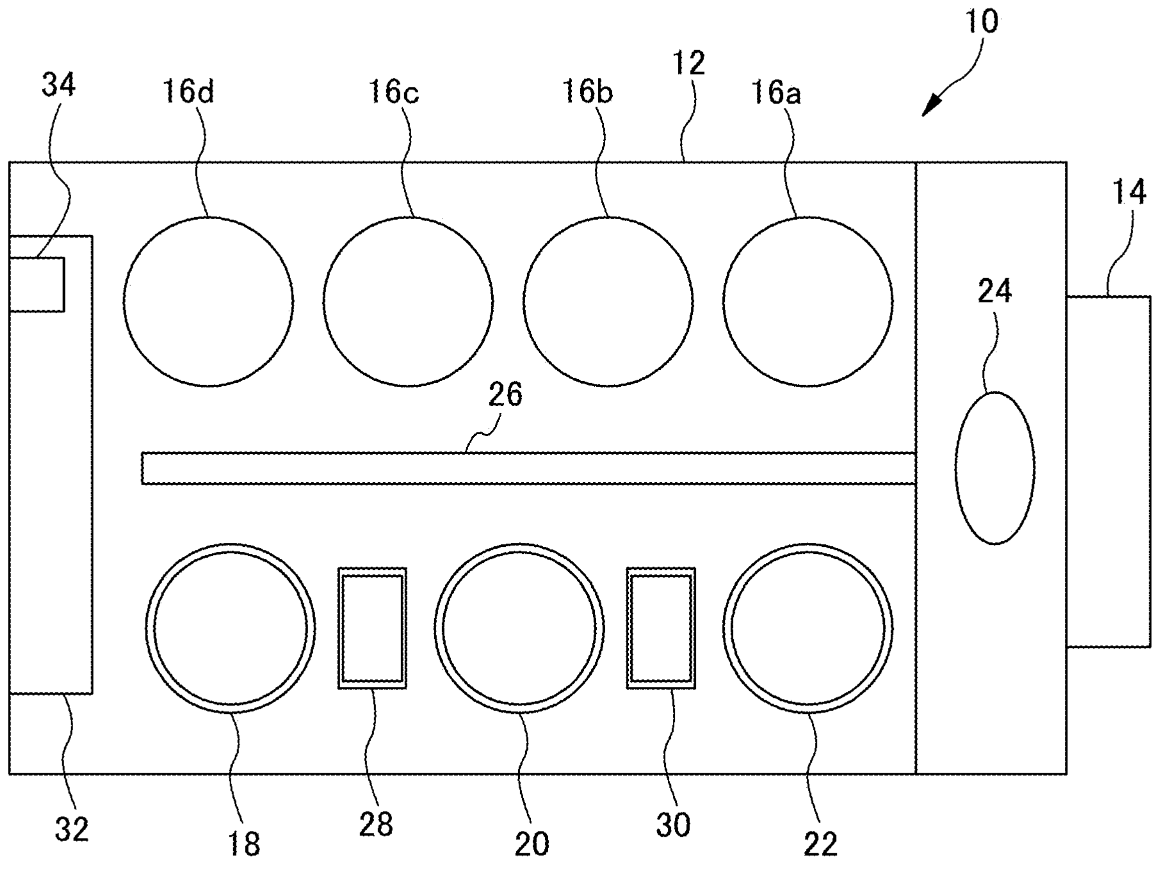
FIG. 1 is a plan view illustrating a schematic configuration of a substrate processing apparatus including a substrate cleaning apparatus according to an embodiment of the invention.

Hereinafter, an embodiment of the invention will be described with reference to the drawings. FIG. 1 schematically illustrates a configuration of a substrate processing apparatus including a substrate cleaning apparatus according to the present embodiment, and the substrate processing apparatus 10 has a housing 12 and a load port 14. For example, an open cassette for accommodating a large number of substrates W is mounted on the load port 14.

A plurality of polishing units 16*a* to 16*d* configured to polish (flatten) a substrate W, a first cleaning unit 18 and a second cleaning unit 20 that clean the polished substrate W, and a drying unit 22 that dries the cleaned substrate W are accommodated inside the housing 12. In the example of FIG. 1, the polishing units 16*a* to 16*d* are aligned along a longitudinal direction of the substrate processing apparatus 10, and the cleaning units 18 and 20 and the drying unit 22 are aligned in parallel with the polishing units 16*a* to 16*d*.

A first transport robot 24 is arranged between the load port 14, and the polishing unit 16*a* and the drying unit 22. The first transport robot 24 delivers the substrate W before polishing received from the load port 14 to the polishing unit 16*a*, and receives the dried substrate W taken out from the drying unit 22. Further, a transport unit 26 is arranged between the polishing units 16*a* to 16*d*, and the cleaning units 18 and 20 and the drying unit 22.

Between the first cleaning unit 18 and the second cleaning unit 20, a second transport robot 28 that delivers the substrate W therebetween is arranged. Further, between the second cleaning unit 20 and the drying unit 22, a third transport robot 30 that delivers the substrate W therebetween is arranged.

A control unit 32 that controls a movement of each device of the substrate processing apparatus 10 is arranged inside the housing 12. The control unit 32 is, for example, a general-purpose computer device, and includes a central processing unit (CPU), a memory that stores a control program, an input unit, a display unit, and the like. Further, the control unit 32 also includes an input unit 34 that receives an external input. Here, the external input may include a mechanical operation by a user and a signal input from an external device in a wired or wireless manner.

The control unit 32 activates the control program stored in a storage unit (memory) 36 to control the movement of each device of the substrate processing apparatus 10. The control program configured to control an operation of the substrate processing apparatus 10 may be installed in advance in a computer constituting the control unit 32, may be stored in a storage medium such as a digital versatile disc (DVD), a Blu-ray disc (BD), or a solid state drive (SSD), or may be installed in the control unit 32 via the Internet.

The cleaning units 18 and 20 of the present embodiment clean the substrate W by bringing a cleaning tool, described later, into contact with a surface of the substrate W while rotating the cleaning tool, and supply a cleaning liquid to perform a rinsing process after the cleaning process. Further, the cleaning units 18 and 20 may use a two-fluid jet cleaning apparatus that cleans the surface of the substrate W by two-fluid jetting together with the cleaning tool.

As an example, the drying unit 22 sprays isopropyl alcohol (IPA) vapor from a nozzle (not illustrated) toward the rotating substrate W to dry the substrate W. Alternatively, the substrate W may be rotated at a high speed to dry the substrate W by centrifugal force.

Figure 2:
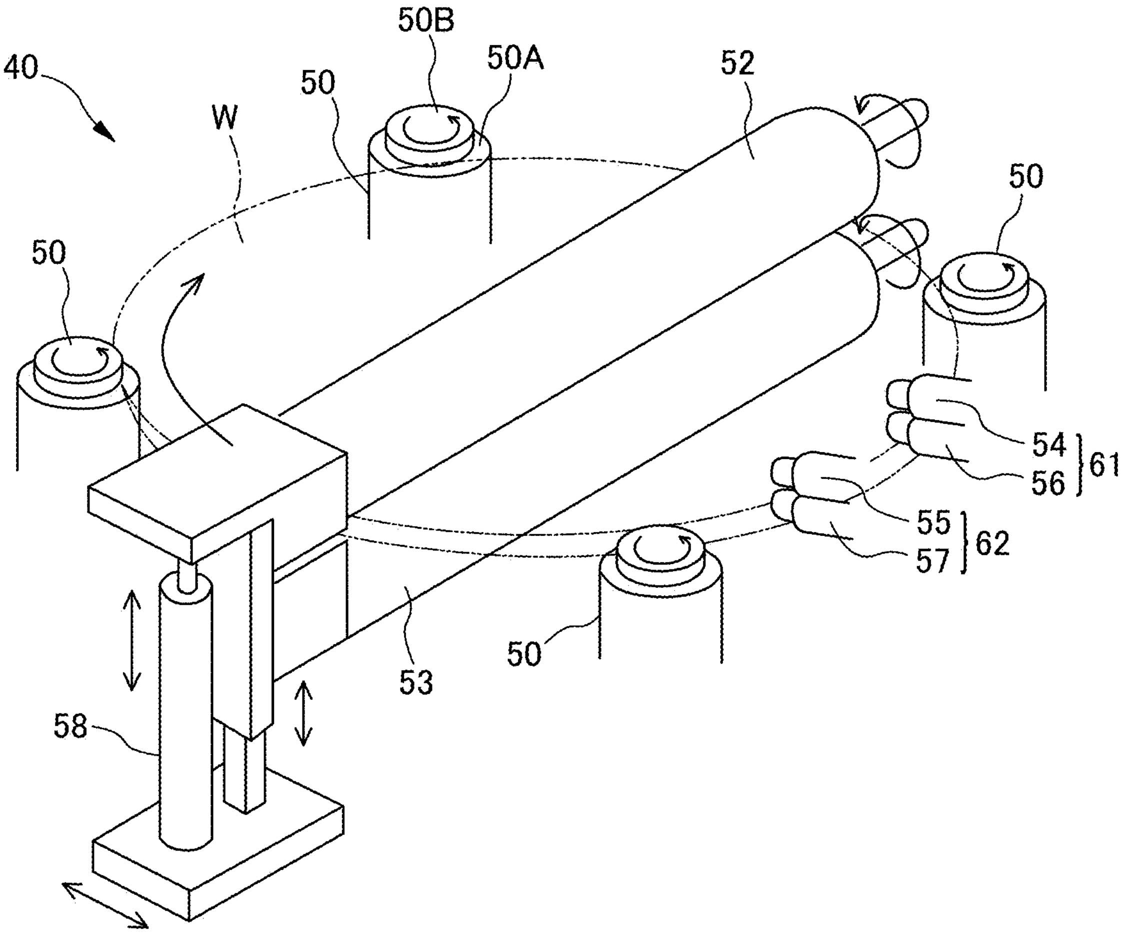
FIG. 2 is a perspective view illustrating a configuration of the substrate cleaning apparatus.
Figure 3:
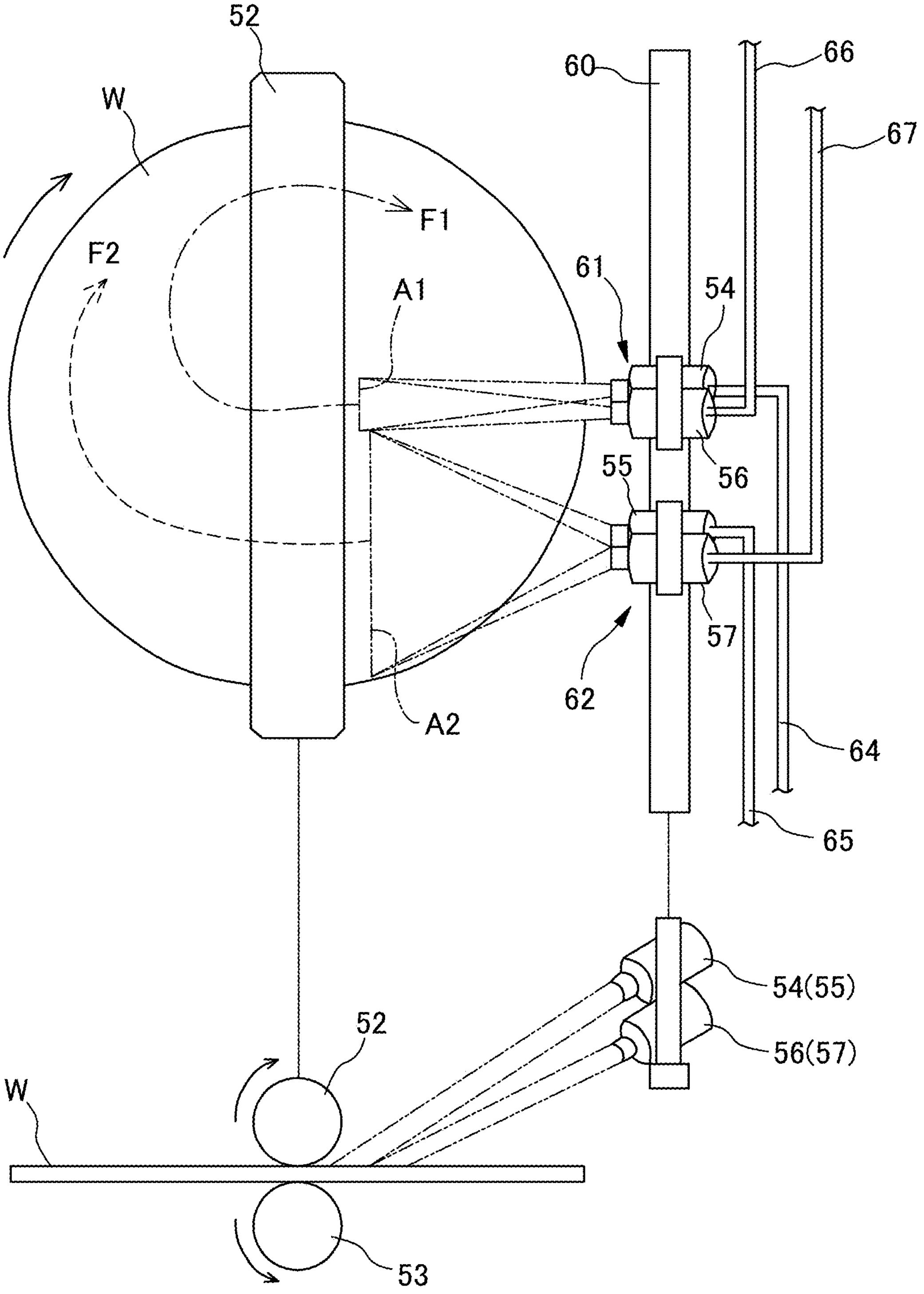
FIG. 3 is a plan view illustrating a configuration of the substrate cleaning apparatus of FIG. 2.
Figure 4:
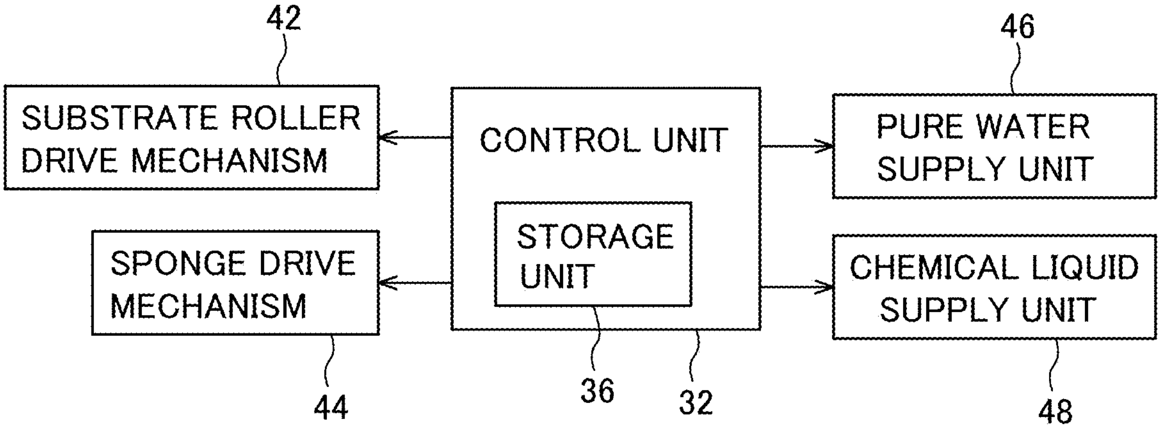
FIG. 4 is a functional block diagram of the substrate cleaning apparatus.

FIGS. 2 and 3 illustrate a schematic configuration of a substrate cleaning apparatus 40 according to the present embodiment, and FIG. 4 is a functional block diagram of the substrate cleaning apparatus. The substrate cleaning apparatus 40 (corresponding to each of the cleaning units 18 and 20 for the substrate in FIG. 1) includes a substrate roller drive mechanism 42 that drives substrate rollers 50 that rotate the substrate W, a sponge drive mechanism 44 that drives roll sponges 52 and 53 configured to brush the substrate, a pure water supply unit 46 that supplies pure water (DIW) as the cleaning liquid, and a chemical liquid supply unit 48 that supplies a chemical liquid as the cleaning liquid.

As the cleaning liquid, for example, a rinsing liquid such as pure water (DIW), an alkaline solution (ammonia water, ammonia hydrogen peroxide (SC1)), a chemical liquid such as a surfactant or a chelating agent, or a mixed chemical liquid thereof can be used according to a film type of a target substrate surface. In the present embodiment, a chemical liquid and pure water (DIW) are used as the cleaning liquid.

The substrate cleaning apparatus 40 includes four substrate rollers 50 arranged on substantially the same horizontal plane, a pair of the roll sponges 52 and 53 each having a substantially cylindrical shape, pure water (DIW) supply nozzles 54 and 55, and chemical liquid supply nozzles 56 and 57. Note that each of the two substrate cleaning apparatuses 40 is separated by a partition wall or the like (not illustrated) such that the cleaning liquid (chemical liquid and pure water) sprayed during a substrate cleaning process does not leak to the outside. Further, the partition wall can be provided with a shutter mechanism configured to take the substrate W in and out of the substrate cleaning apparatus 40.

A combination of the pure water supply nozzle 54 and the chemical liquid supply nozzle 56 that supply the cleaning liquid to the vicinity of the center of the substrate W is referred to as a first cleaning liquid supply unit 61. Further, a combination of the pure water supply nozzle 55 and the chemical liquid supply nozzle 57 that supply the cleaning liquid to a region between the center and edge of the substrate W is referred to as a second cleaning liquid supply unit 62.

Each of the substrate rollers 50 has a two-stage configuration of a shoulder part (support part) 50A and a holding part 50B provided on the shoulder part 50A and having a smaller diameter, and holds a side surface (edge part) of the substrate W by the holding part 50B while supporting a bottom surface of the substrate W by the shoulder part 50A. The substrate rollers 50 are movable in directions of coming close to and separating from each other by an air cylinder (not illustrated) provided in the substrate roller drive mechanism 42. When the substrate rollers 50 come close to each other, the substrate W can be held substantially horizontally by the holding parts 50B. At least one of the substrate rollers 50 is configured to be rotationally driven by the substrate roller drive mechanism 42, whereby the substrate W can be rotated in the horizontal plane. Further, a rotation speed of the substrate roller 50 (that is, a rotation speed of the substrate W) can be appropriately adjusted by the control unit 32.

The roll sponges 52 and 53 extend in the horizontal plane and come into contact with the substrate W held by the substrate rollers 50 to clean the substrate W. Each of the roll sponges 52 and 53 is rotated about its longitudinal direction by the sponge drive mechanism 44. Further, each of the roll sponges 52 and 53 is attached to a guiderail 58 that guides a vertical movement thereof, and can be moved vertically along the guiderail 58 by the sponge drive mechanism 44, thereby being movable between a position in contact with the substrate W and a position retracted from the substrate W.

The pure water supply nozzles 54 and 55 are located obliquely above the substrate W and supply the pure water to an upper surface of the substrate W. The chemical liquid supply nozzles 56 and 57 are located obliquely above the substrate W and supply the chemical liquid to the upper surface of the substrate W. The pure water supply nozzles 54 and 55 and the chemical liquid supply nozzles 56 and 57 are supported by a support member 60 extending substantially parallel to the longitudinal directions of the roll sponges 52 and 53. The pure water supply nozzles 54 and 55 are connected to the pure water supply unit 46 via separate pure water supply tubes 64 and 65, respectively, thereby individually supplying the pure water. Further, the chemical liquid supply nozzles 56 and 57 are connected to the chemical liquid supply unit 48 via separate chemical liquid supply tubes 66 and 67, respectively, thereby, individually supplying the chemical liquid.

Each of the pure water supply unit 46 and the chemical liquid supply unit 48 has a flow rate adjusting function and a temperature adjusting mechanism and the operation thereof is controlled by the control unit 32. This makes it possible to appropriately adjust flow rates and temperatures of the pure water and the chemical liquid supplied to the pure water supply nozzles 54 and 55 and the chemical liquid supply nozzles 56 and 57.

The substrate cleaning apparatus 40 performs a cleaning process and a rinsing process on the substrate W as follows. When the substrate W is transported inside, the substrate rollers 50 are at positions separating from each other. Further, the roll sponge 52 on the upper side is held at a position raised from a transport position of the substrate W, and the roll sponge 53 on the lower side is held at a position lowered from the transport position of the substrate W.

The substrate W transported by a transport unit (not illustrated) is first placed on the shoulder parts 50A of the substrate rollers 50. Thereafter, the substrate roller drive mechanism 42 is driven to move the substrate rollers 50 in the direction of coming close to each other (direction toward the substrate W), whereby the substrate W is held substantially horizontally by the holding parts 50B.

Next, when the sponge drive mechanism 44 is driven, the roll sponge 52 on the upper side is lowered to be in contact with the upper surface of the substrate W, and the roll sponge 53 on the lower side is raised to be in contact with the lower surface of the substrate W. As a result, a region including the center of the substrate W is sandwiched between the roll sponges 52 and 53 as illustrated in FIG. 2. Note that positions at which the roll sponges 52 and 53 are in contact with the substrate W are not limited to the positions illustrated in FIG. 2, and the roll sponges 52 and 53 may be configured to be in contact with positions deviated from the center of the substrate W.

Thereafter, the pure water supply unit 46 and the chemical liquid supply unit 48 are driven so that the pure water and the chemical liquid whose flow rates and temperatures have been adjusted are supplied to the substrate W from the pure water supply nozzles 54 and 55 and the chemical liquid supply nozzles 56 and 57. Then, the substrate roller drive mechanism 42 and the sponge drive mechanism 44 are driven so that the substrate W is rotated in the horizontal plane by the substrate rollers 50 at a set speed, and the roll sponges 52 and 53 come into contact with the upper and lower surfaces of the substrate W while rotating about the axes thereof, whereby the upper and lower surfaces of the substrate W are scrub-cleaned. In the scrub-cleaning process, only the chemical liquid may be supplied from the chemical liquid supply nozzles 56 and 57.

After the scrub-cleaning, the roll sponges 52 and 53 are retracted from the upper and lower surfaces of the substrate W, and the pure water and the chemical liquid are supplied to the substrate W from the pure water supply nozzles 54 and 55 and the chemical liquid supply nozzles 56 and 57, whereby the rinsing process after the substrate cleaning is performed. Details of the rinsing process will be described later. After the rinsing process, the substrate W is transported out of the substrate cleaning apparatus 40 by a transport unit (not illustrated).

In FIG. 3, it is assumed that the substrate W rotates clockwise as viewed from the upper surface side, and the roll sponge 52 on the upper side of the substrate W rotates clockwise as viewed from the side surface. In the example of FIG. 3, the chemical liquid supply nozzles 56 and 57 are arranged above the pure water supply nozzles 54 and 55, and the cleaning liquid (chemical liquid and pure water) is supplied to the vicinity of a region where the roll sponges 52 and 53 are in contact with the substrate W. Supply directions of the cleaning liquids by the pure water supply nozzles 54 and 55 and the chemical liquid supply nozzles 56 and 57 are substantially orthogonal to the longitudinal directions of the roll sponges 52 and 53.

It is noted that the pure water supply nozzles 54 and 55 may be installed above the chemical liquid supply nozzles 56 and 57. Further, positions where the chemical liquid is supplied to the substrate W by the chemical liquid supply nozzles 56 and 57 may be the same as or different from positions where the pure water is supplied to the substrate W by the pure water supply nozzles 54 and 55, respectively. For example, scrub-cleaning can be more effectively performed by bringing the positions where the chemical liquid is sprayed onto the substrate W by the chemical liquid supply nozzles 56 and 57 closer to the roll sponges 52 and 53.

The first cleaning liquid supply unit 61 is a so-called pen ejector, and supplies the cleaning liquid substantially perpendicularly to the longitudinal direction of the roll sponge 52 at a relatively small angle in a width direction toward the vicinity of the center of the substrate W. When the cleaning liquid from the first cleaning liquid supply unit 61 passes between the roll sponge 52 and the substrate W, a contact region between the substrate W and the roll sponge 52 is cleaned. Thereafter, the cleaning liquid enters a depth of the roll sponge 52. Since the centrifugal force is not so large in the vicinity of the center of the substrate W, the cleaning liquid returns to the roll sponge 52 side with the rotation of the substrate W (see an arrow F1 in FIG. 3). As a result, the deep side of the upper surface of the substrate W is also cleaned by the roll sponge 52.

The second cleaning liquid supply unit 62 supplies the cleaning liquid in a spray form toward a position slightly away from the center of the substrate W at a larger angle in the width direction than the first cleaning liquid supply unit 61 in a direction that is the same as a rotation direction of the substrate W and substantially perpendicular to the longitudinal direction of the roll sponge 52. Since the cleaning liquid is supplied in the spray form, the momentum of the cleaning liquid can be suppressed to reduce a load on the substrate W.

When the cleaning liquid from the second cleaning liquid supply unit 62 passes between the roll sponge 52 and the substrate W, a contact region between the substrate W and the roll sponge 52 is cleaned in a part slightly outside the center of the substrate W. Here, the rotation direction of the substrate W, a rotation direction of the roll sponge 52, and the supply direction of the cleaning liquid from the second cleaning liquid supply unit 62 coincide with each other in a region to which the cleaning liquid from the second cleaning liquid supply unit 62 is supplied. Therefore, relative speeds of the substrate W and the roll sponge 52 decrease, the time during which the cleaning liquid is in contact with the substrate W and the roll sponge 52 increases, and cleaning performance is improved.

The cleaning liquid from the second cleaning liquid supply unit 62 enters a depth of the roll sponge 52. Since the supply direction of the cleaning liquid is perpendicular to the roll sponge 52, and the rotation direction of the substrate W coincides with the supply direction of the cleaning liquid, the cleaning liquid is not pushed back to the inside of the substrate W by the rotation of the substrate W, but is blown off to the outside of the substrate W by the centrifugal force (see an arrow F2 in FIG. 3). This makes it possible to prevent the cleaning liquid after being used for long-time cleaning from remaining on the substrate W.

Here, it is desirable that the supply direction from the first cleaning liquid supply unit 61 and the supply direction from the second cleaning liquid supply unit 62 coincide with each other on the upper surface of the substrate W as illustrated in FIG. 3. This is because, if the supply directions of the cleaning liquids are opposite, there is a possibility that the cleaning liquids soar up due to occurrence of convection when the cleaning liquid from the first cleaning liquid supply unit 61 and the cleaning liquid from the second cleaning liquid supply unit 62 collide, so that the cleaning liquids containing dust or the like in the air land on the substrate W to contaminate the substrate W.

Figure 5:
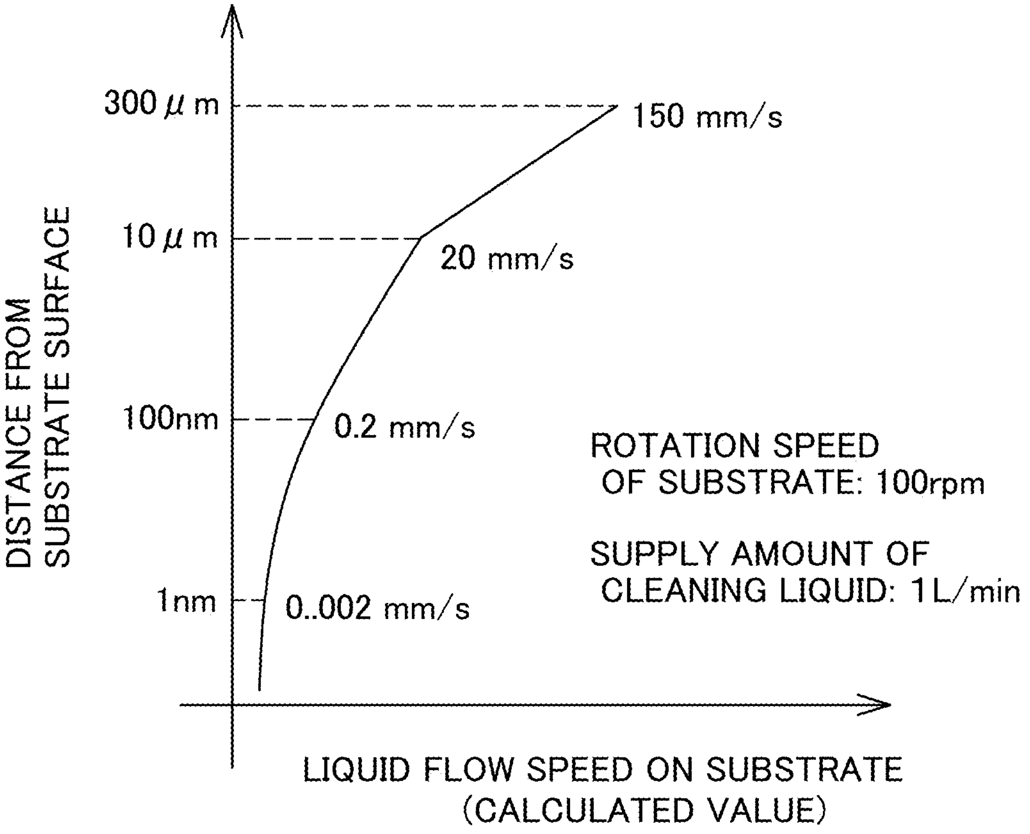
FIG. 5 is a graph illustrating an example of a relationship between a distance from a surface of a substrate during rotation and a flow speed of a cleaning liquid on the substrate.

FIG. 5 illustrates an example (calculated value) of a relationship between a flow speed of a liquid (liquid flow speed) and a distance from the surface of the substrate W, and illustrates a case where the rotation speed of the substrate is 100 rpm and a supply amount of the liquid (pure water) is 1 L/min. It can be seen that a flow of the liquid in the vicinity (a region having a small distance from the surface) of the substrate W is extremely small due to influences of friction between the substrate W and the liquid and the viscosity of the liquid.

Figure 6:
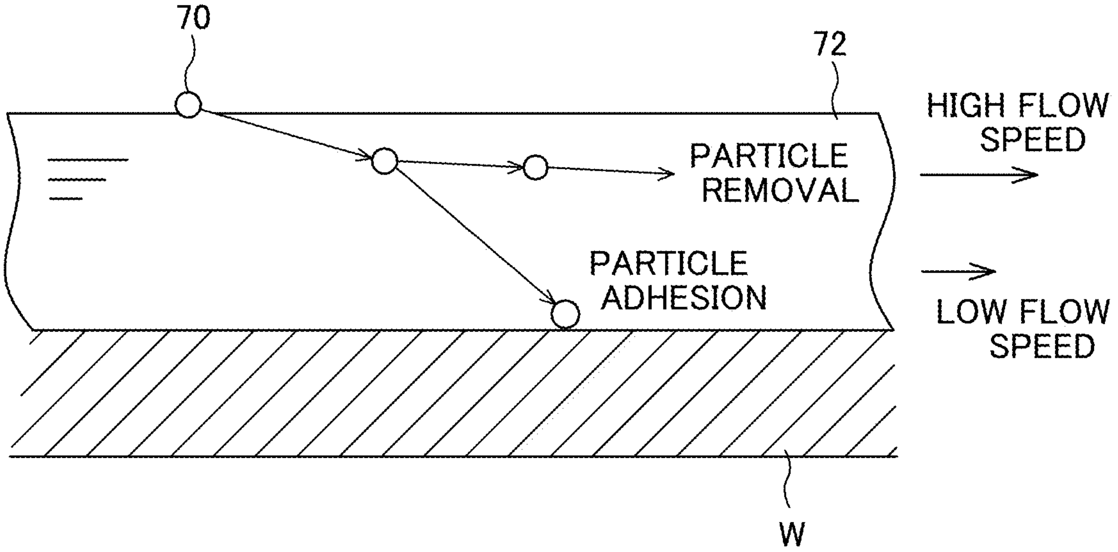
FIG. 6 is an explanatory view illustrating a state in which particles on the substrate are removed or reattached.

FIG. 6 is an explanatory view illustrating a flow of a particle in a case where the particle adheres to a liquid film of the cleaning liquid on a substrate W. In a case where the particle 70 is stopped in an upper layer of the liquid film 72, since a flow of the liquid in the upper layer is fast (the liquid flow speed is high), the particle is easily removed to the outside of the substrate W by the rinsing process involving the rotation of the substrate W. On the other hand, in a case where the particle reaches a lower layer of the liquid film, since a flow of the liquid in the lower layer is slow (the liquid flow speed is low), the particle is hardly removed to the outside of the substrate W.

Therefore, the particle remaining on the surface of the substrate after the cleaning process and the cleaning liquid (to which a particle has adhered) dropped from the roll sponge (cleaning tool) onto the substrate sometimes remain in the liquid film of the substrate W during the rinsing process and adhere to the surface of the substrate W after the rinsing process. Then, the quality of the substrate after the polishing and cleaning process is degraded.

Here, adhesion amount of particles in a spin rinsing process depends on a mass transfer coefficient k (a coefficient that determines a transfer amount of the particles in the vertical direction with respect to a substrate surface). The higher the mass transfer coefficient k, the easier the mass transfer in the vertical direction. That is, the particles adhering to the liquid film on the substrate W are easily transferred toward the surface of the substrate W (in the vertical direction).

The mass transfer coefficient k is defined by the following formula.

$$k = 0.332 \times Sc^{1/3} \times Re_x^{1/2} \times (D/x)$$

$$Sc = \mu/D, \text{ and } Re_x = ux/v$$

Here, D [$m^2$/s] is a diffusion coefficient, x is a radial position of the substrate W, μ is a viscosity coefficient, u is a mass transfer rate, and vis a kinematic viscosity coefficient.

Figure 7A:
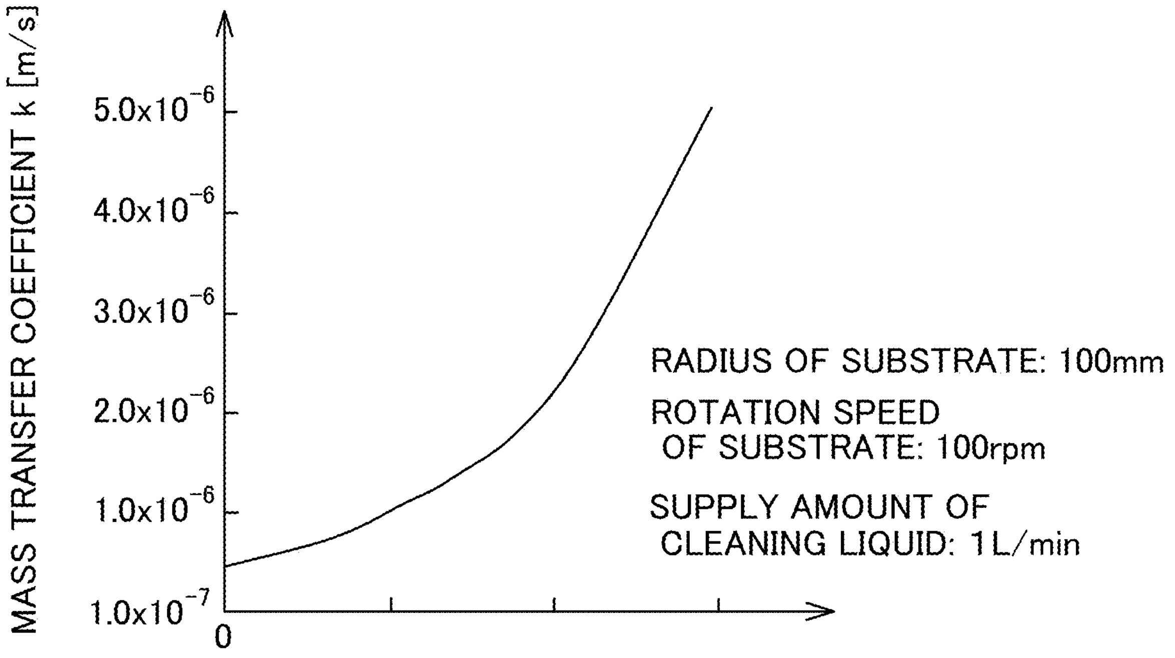
FIGS. 7A and 7B are graphs illustrating a relationship between a liquid temperature on the substrate and a mass transfer coefficient.
Figure 7B:
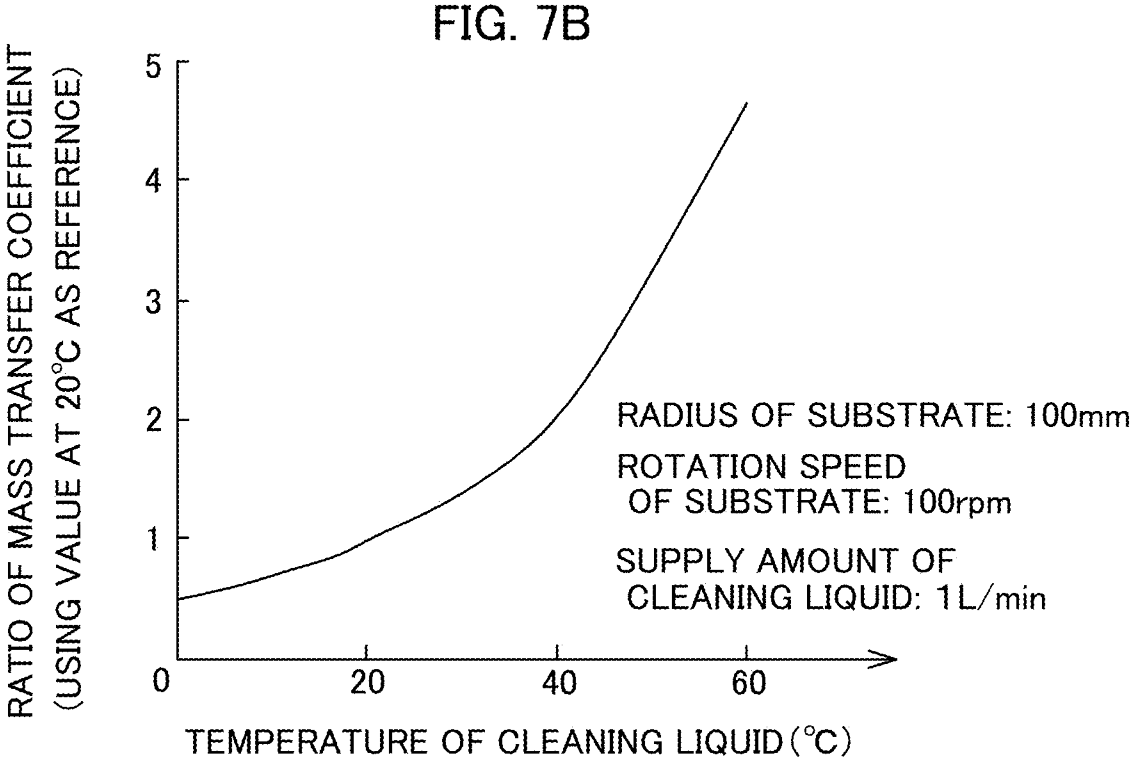

FIGS. 7A and 7B are graphs illustrating the temperature dependence of the mass transfer coefficient k, in which FIG. 7A illustrates an absolute value (calculated value) of the mass transfer coefficient k, and FIG. 7B illustrates a ratio of the mass transfer coefficient at each temperature when the mass transfer coefficient k at 20° C. is used as a reference. Note that FIGS. 7A and 7B illustrate calculation results when the rotation speed of the substrate W is 100 rpm, a radial position r of the substrate W is 100 mm, and the supply amount of the liquid is 1 L/min. From the graphs of FIGS. 7A and 7B, it can be seen that the mass transfer coefficient k tends to increase (that is, the particles of the liquid film easily re-adhere to the substrate W) as the temperature of the liquid increases.

Figure 8:
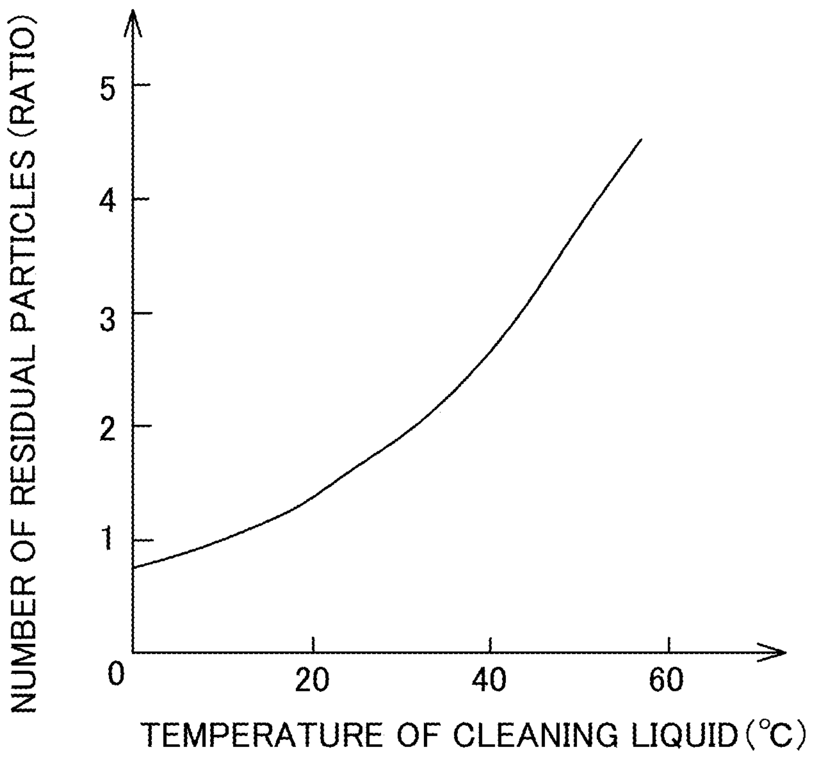
FIG. 8 is a graph illustrating a relationship between the liquid temperature on the substrate and a ratio of the number of residual particles.

FIG. 8 is a graph illustrating a ratio of the number of residual particles in the substrate W after the rinsing process when the temperature of the cleaning liquid (pure water) supplied in the rinsing process is changed, and it can be seen that the number of residual particles decreases as the liquid temperature decreases. The liquid temperature of the cleaning liquid supplied in the rinsing process is preferably set to 0° C. to 20° C., and particularly preferably set to 0° C. to 15° C. when the rotation speed of the substrate W is 300 rpm or lower. Further, it is preferable to set the liquid temperature of the cleaning liquid in the rinsing process to be lower than a liquid temperature in scrub-cleaning process.

Therefore, when the temperature of the pure water supplied to the substrate W is lowered in the rinsing process after the cleaning process, the particle remaining in the liquid film after the cleaning process and the particle included in the cleaning liquid dropped from the roll sponge to the liquid film on the substrate W can be efficiently discharged to the outside of the substrate W by the rinsing process. As a result, it is not necessary to rotate the substrate W at a high speed in order to remove the particles in the liquid film on the substrate W or to perform the rinsing process for a long time, and the time required for the rinsing process can be shortened (throughput can be improved).

Second Embodiment

Figure 9:
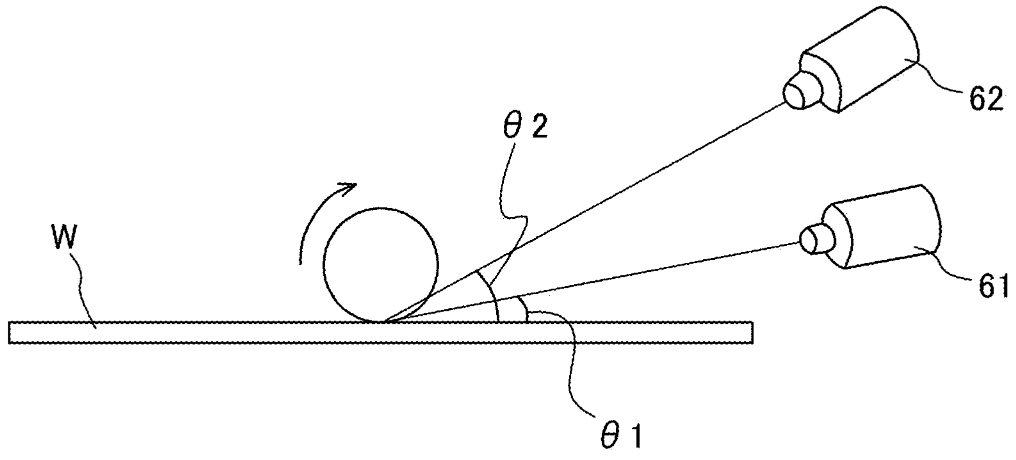
FIG. 9 is an explanatory view illustrating an example of a positional relationship between a pin nozzle and a spray nozzle.

FIG. 9 illustrates an outline of a substrate cleaning apparatus according to a second embodiment, and the same configuration as the above-described first embodiment is adopted except for a difference in positional relationship between the first cleaning liquid supply unit 61 and the second cleaning liquid supply unit 62, and thus, detailed description thereof will be omitted.

In FIG. 9, a supply angle (angle θ1 between a central axis of a nozzle and the substrate W) of a cleaning liquid by the nozzle constituting the first cleaning liquid supply unit 61 configured using a pin nozzle is configured to be smaller than a supply angle θ2 of the cleaning liquid by a nozzle constituting the second cleaning liquid supply unit 62. When the supply angle of the cleaning liquid is smaller, horizontal components of a speed of the cleaning liquid reaching the substrate W increase, and the cleaning liquid is easily discharged to the outside of the substrate W without whirling inward due to the rotation of the substrate W. As a result, particles in a liquid film on the substrate W can be efficiently discharged to the outside.

Figure 10A:
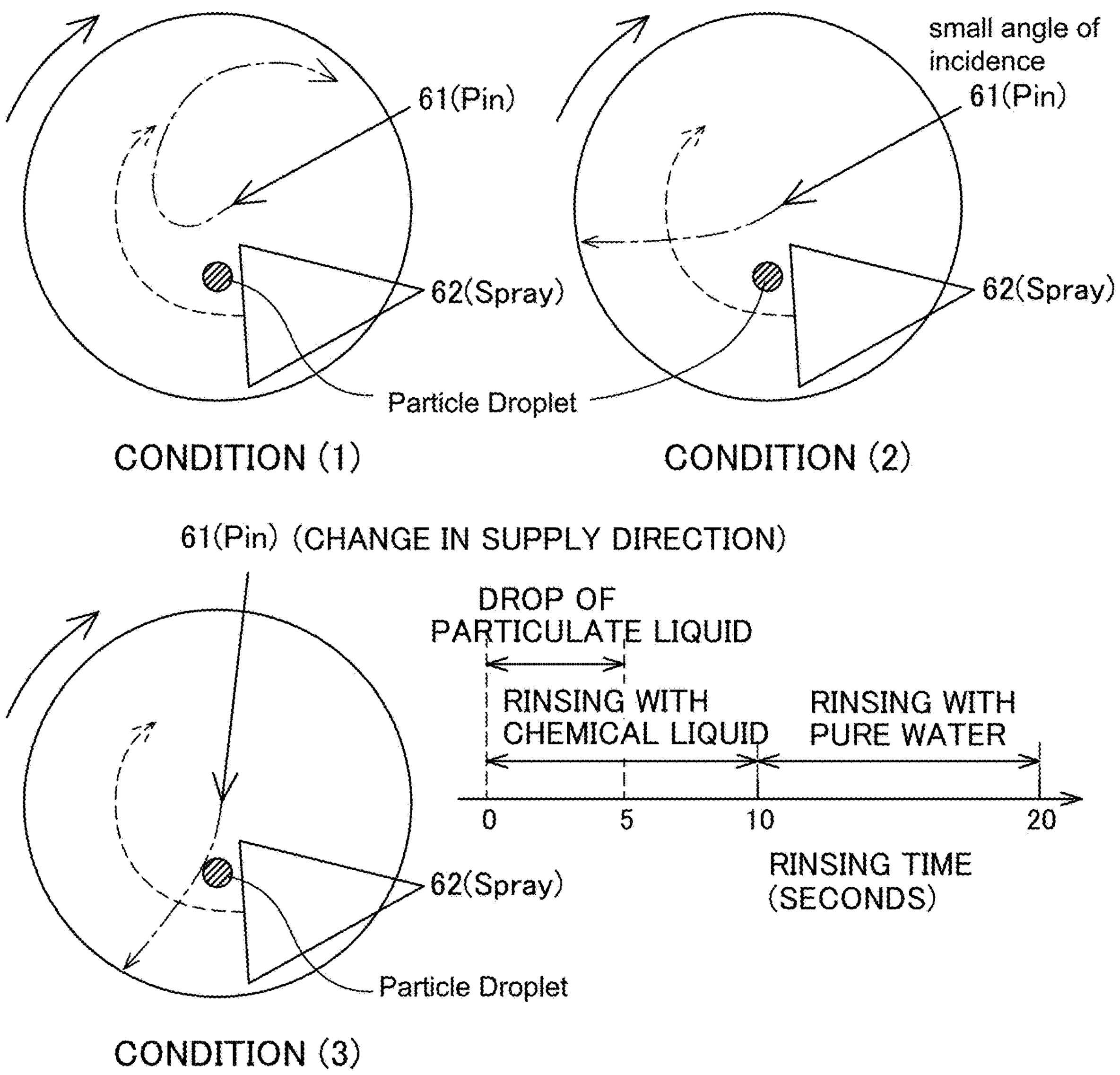
FIGS. 10A and 10B are explanatory views illustrating a positional relationship between a pin nozzle and a spray nozzle and a ratio of the number of residual particles.
Figure 10B:
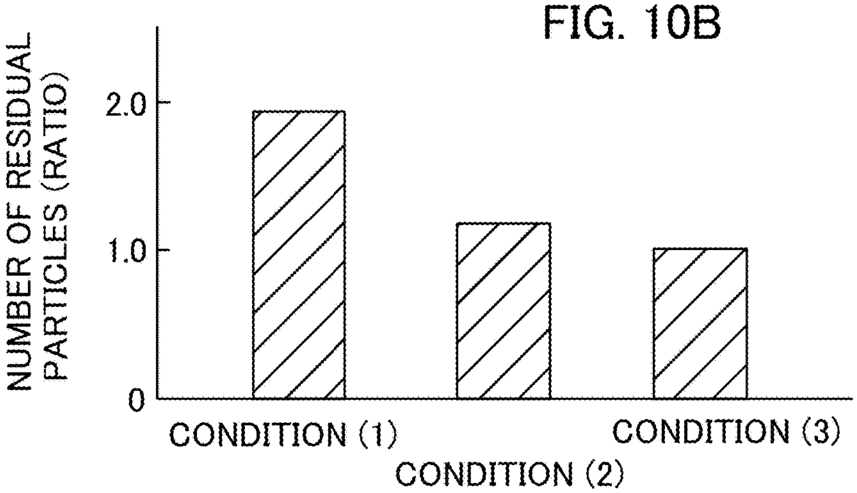

FIGS. 10A and 10B are graphs illustrating a change in a ratio of the number of residual particles when the arrangement of the first cleaning liquid supply unit 61 is changed, in which FIG. 10A illustrates the arrangement of the first cleaning liquid supply unit 61 and conditions of a rinsing process, and FIG. 10B illustrates the ratio of the number of residual particles under each of the conditions. In FIG. 10A, condition (1) is that the first cleaning liquid supply unit 61 is arranged at the same position as that in the first embodiment, and the cleaning liquid is supplied toward the center of the substrate W at substantially the same height (substantially the same ejection angle) as the second cleaning liquid supply unit. In FIG. 10A, a particulate liquid dropping position indicates a position where a particulate liquid is dropped in order to perform an experiment simulating discharge of the cleaning liquid falling from a roll sponge.

Condition (2) is a case where the supply angle of the cleaning liquid by the first cleaning liquid supply unit 61 configured using the pin nozzle is made smaller than that of the second cleaning liquid supply unit 62 (see FIG. 9), and the cleaning liquid from the first cleaning liquid supply unit 61 is easily discharged to the outside of the substrate W without whirling inward due to the rotation of the substrate W. In the present embodiment, the supply angle θ1 of the cleaning liquid by the first cleaning liquid supply unit 61 is set to 15°, and the supply angle θ2 of the cleaning liquid by the second cleaning liquid supply unit 62 is set to 30°.

Condition (3) is that the cleaning liquid by the first cleaning liquid supply unit 61 is supplied toward the particulate liquid dropping position while setting the supply angle of the cleaning liquid by the first cleaning liquid supply unit 61 configured using the pin nozzle to be the same angle as that in the condition (2). In the conditions (1) to (3), a rinsing time with a chemical liquid is set to 10 seconds, a rinsing time with pure water thereafter is set to 10 seconds, and the time during which the cleaning liquid is dropped is set to 5 seconds. Further, conditions such as a rotation speed of the substrate W, a flow rate and a temperature of the cleaning liquid, and a radius of the substrate W are the same in the conditions (1) to (3).

FIG. 10B illustrates the ratio of the number of residual particles under each of the conditions, and it can be seen that particles on the substrate W are forcibly discharged by the cleaning liquid by decreasing the supply angle of the cleaning liquid from the cleaning liquid supply unit configured using the pin nozzle so that a particle removal effect by the cleaning liquid is enhanced as compared with the condition (1). Note that the supply angle θ1 of the cleaning liquid by the first cleaning liquid supply unit 61 is preferably in a range of 0° to 30°, and particularly preferably 5° to 10°.

Third Embodiment

Figure 11:
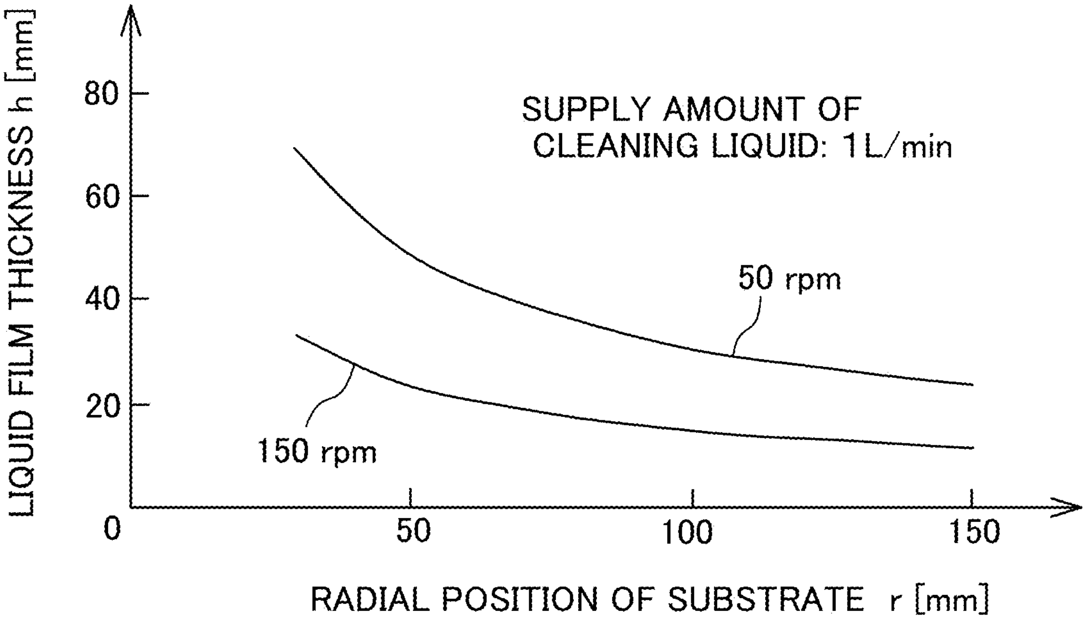
FIG. 11 is a graph illustrating a relationship between a radial position of a substrate and a liquid film thickness on the substrate.

In a third embodiment, a particle removal effect by a cleaning liquid is enhanced by changing a rotation speed of the substrate W during a rinsing process. FIG. 11 illustrates an example of a film thickness of the cleaning liquid with respect to a radial position of the substrate, and a supply amount of the cleaning liquid is set to 1 L/min. The same conditions are set except that the rotation speed of the substrate W is set to 50 rpm and 150 rpm.

From a graph of FIG. 11, the vicinity of the center of the substrate W corresponds to a part to which the cleaning liquid is supplied, and has a higher film thickness, and the film thickness of the cleaning liquid decreases toward the outer periphery of the substrate W. Further, it can be seen that the film thickness of the cleaning liquid increases as the rotation speed of the substrate W decreases since centrifugal force acting on the cleaning liquid decreases. When the film thickness of the cleaning liquid is increased, it is possible to suppress particles adhering during the rinsing process from transferring to the surface of the substrate W and to enhance the particle removal effect.

Figure 12:
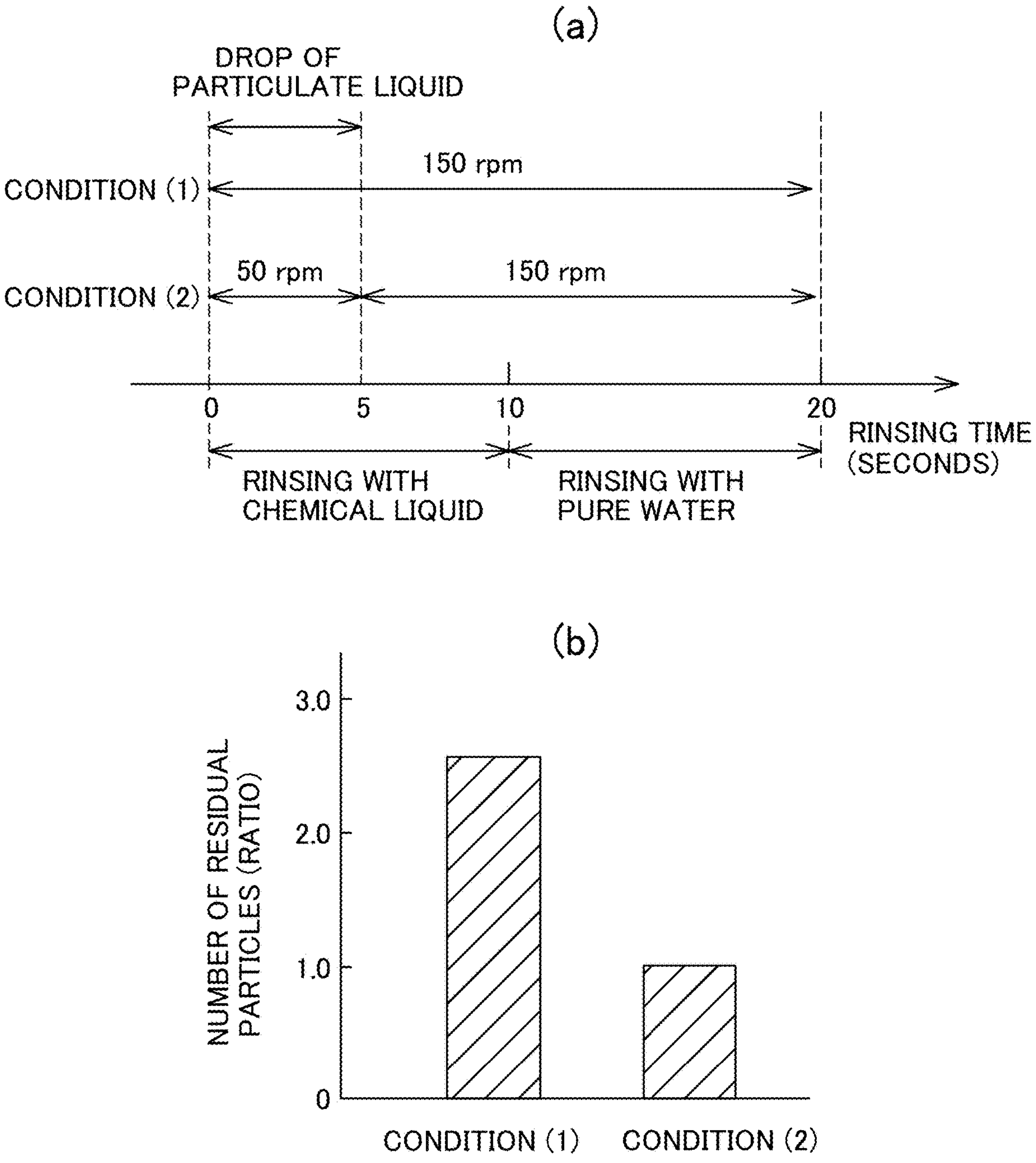
FIGS. 12A and 12B are explanatory views of a rotation speed of the substrate and simulation conditions of a rinsing process.
Figure 13:
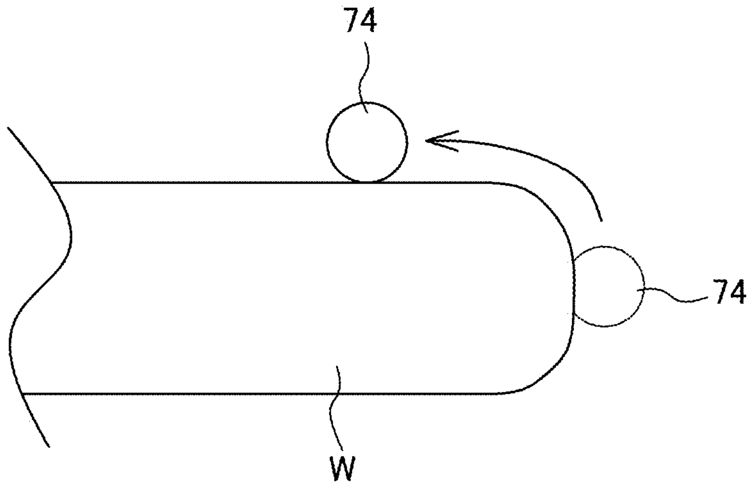
FIG. 13 is an explanatory view illustrating a state in which a cleaning liquid whirls inward from an edge part to a surface of a substrate.

FIGS. 12A and 12B illustrate examples of the rinsing process when a condition of the rotation speed of the substrate W is changed, in which FIG. 12A illustrates the conditions regarding the rotation speed of the substrate W, and FIG. 12B illustrates results of ratios of the number of residual particles. In condition (1), the same rotation speed (150 rpm) is set from the start to the end (after 20 seconds) of rinsing. In condition (2), a lower speed (50 rpm) is set for 5 seconds from the start of rinsing, and thereafter, the same speed (150 rpm) as that in the condition (1) is set for 15 seconds. In the conditions (1) and (2), a rinsing time with a chemical liquid is set to 10 seconds, a rinsing time with pure water thereafter is set to 10 seconds, and the time during which the cleaning liquid is dropped is set to 5 seconds. Further, conditions such as a flow rate and a temperature of the cleaning liquid and a radius of the substrate W are the same in the conditions (1) and (2).

FIG. 12B illustrates the ratio of the number of residual particles under each of the conditions, and the film thickness of the cleaning liquid on the substrate W increases by decreasing the rotation speed of the substrate W so that particles easily transfer to a peripheral part of the substrate W without adhering to the substrate W as compared with the condition (1). Thereafter, the rotation speed of the substrate W is increased so that particles are easily discharged to the outside of the substrate W by the centrifugal force. As a result, it can be seen that the particle removal effect by the cleaning liquid is enhanced.

In the present embodiment, the rotation speed of the substrate W as the lower speed is set to 50 rpm, but may be any speed lower than a normal speed (150 rpm in the present embodiment, but preferably 100 rpm or higher) without being limited thereto, and is preferably set to, for example, 30 rpm to 150 rpm. Further, the time during which the lower speed is set is not limited to 5 seconds, and can be adjusted in consideration of throughput of the rinsing process and the flow rate of the cleaning liquid.

Although the rotation speed of the substrate W is changed in two stages in the present embodiment, the invention is not limited thereto, and for example, the rotation speed may be switched in three stages (in the order of 50 rpm, 100 rpm, and 150 rpm) or four or more stages.

Fourth Embodiment

A liquid adhering to the substrate W may transfer during and after substrate cleaning (and during and after a rinsing process). This is because a droplet is drawn to transfer to a side having higher solid surface energy, and the droplet easily transfers to a surface of the substrate W since the surface is hydrophilic has high solid surface energy. Therefore, there is a case where a cleaning liquid transfers from an edge part of a back surface of the substrate toward an edge part of the surface of the substrate during the substrate cleaning. Further, there is a case where the cleaning liquid adhering to a side surface of the substrate whirls inward to the surface of the substrate W after the substrate cleaning. Then, there is a possibility that particles derived from the cleaning liquid adhere to the surface of the substrate W.

Therefore, in the present embodiment, the side surface and the back surface of the substrate W are subjected to a hydrophilization treatment in a substrate cleaning process or a stage before the substrate cleaning process to prevent the cleaning liquid adhering to the side surface and the back surface from whirling inward to the surface of the substrate W. As a method of the hydrophilization treatment, it is preferable to eject a mixed liquid of sulfuric acid and hydrogen peroxide water, a hydrogen fluoride-based chemical liquid, or a liquid of alcohols such as isopropyl alcohol to the side surface and the back surface, or to perform an ozone treatment or a plasma treatment on the side surface and the back surface of the substrate W.

In each of the above embodiments, the particle removal effect by the cleaning liquid is enhanced by adjusting the liquid temperature of the cleaning liquid, the arrangement of the cleaning liquid supply unit configured using the pin nozzle, and the rotation speed of the substrate W. A plurality of combinations of these methods may be used, whereby the particle removal effect by the cleaning liquid can be further enhanced.

The above embodiments have been described for the purpose of enabling a person with ordinary skill in the art to which the inventions pertain to implement the invention. It is a matter of course that those skilled in the art can make various modifications of the above embodiments, and technical ideas of the invention can also be applied to other embodiments. The invention is not limited to the described embodiments, but is to be construed in the broadest scope according to the technical ideas defined by the claims.

What is claimed is:

1. A substrate cleaning apparatus that brings a cleaning tool into sliding contact with a surface of a substrate while rotating the substrate to perform scrub-cleaning, the substrate cleaning apparatus comprising:

a cleaning tool drive mechanism configured to retract the cleaning tool from the surface of the substrate after the scrub-cleaning; and a cleaning liquid supply unit configured to eject a cleaning liquid to the surface of the substrate to perform a rinsing process of the substrate after the scrub-cleaning, wherein a temperature of the cleaning liquid in the rinsing process is set to 0° C. to 15° C., wherein the cleaning liquid supply unit is configured to supply the cleaning liquid to the substrate in the scrub-cleaning, and a temperature of the cleaning liquid supplied in the rinsing process is set to be lower than a temperature of the cleaning liquid supplied in the scrub-cleaning.

2. The substrate cleaning apparatus according to claim 1, wherein the cleaning liquid supply unit includes a first cleaning liquid supply unit configured to supply the cleaning liquid toward a vicinity of a center of the substrate and a second cleaning liquid supply unit configured to supply the cleaning liquid in a spray form toward a region between the center and an edge of the substrate, and when an ejection angle of the cleaning liquid by the first cleaning liquid supply unit with respect to the surface of the substrate is defined as a first ejection angle, and an ejection angle of the cleaning liquid by the second cleaning liquid supply unit with respect to the surface of the substrate is defined as a second ejection angle, the first ejection angle is smaller than the second ejection angle.

3. The substrate cleaning apparatus according to claim 2, wherein the first ejection angle is in a range of 5° to 10°.

4. The substrate cleaning apparatus according to claim 1, further comprising a substrate rotating mechanism configured to rotate the substrate at a predetermined speed, wherein the substrate rotating mechanism is configured to rotate the substrate at a first speed in a first period during the rinsing process and rotate the substrate at a second speed faster than the first speed in a second period following the first period.

5. The substrate cleaning apparatus according to claim 4, wherein the first speed is in a range of 30 rpm to 150 rpm.

6. A substrate processing apparatus comprising:

a polishing unit configured to perform a polishing process on the substrate; and the substrate cleaning apparatus according to claim 1 configured to perform a cleaning process on the substrate after the polishing process.

7. A substrate cleaning method comprising:

bringing a cleaning tool into sliding contact with a surface of a substrate while rotating the substrate to perform scrub-cleaning;

retracting the cleaning tool from the surface of the substrate after the scrub-cleaning; and ejecting a cleaning liquid to the surface of the substrate to perform a rinsing process of the substrate after the scrub-cleaning, wherein a temperature of the cleaning liquid in the rinsing process is set to 0° C. to 15° C., wherein the cleaning liquid supply unit is configured to supply the cleaning liquid to the substrate in the scrub-cleaning, and a temperature of the cleaning liquid supplied in the rinsing process is set to be lower than a temperature of the cleaning liquid supplied in the scrub-cleaning.

* * * * *